United States Patent [19]

Henry

[11] 4,344,747

[45] Aug. 17, 1982

[54] SENSING APPARATUS FOR PELLETIZING PROCESS

[75] Inventor: Richard K. Henry, Newark, Ohio

[73] Assignee: Owens-Corning Fiberglas Corporation, Toledo, Ohio

[21] Appl. No.: 171,514

[22] Filed: Jul. 23, 1980

Related U.S. Application Data

[63] Continuation-in-part of Ser. No. 974,417, Dec. 29, 1978, abandoned.

[51] Int. Cl.$^3$ ............................................... B01J 2/14
[52] U.S. Cl. ................................... 425/140; 425/145; 425/147; 425/222; 264/117
[58] Field of Search ............... 425/140, 145, 147, 222; 264/117

[56] References Cited

U.S. PATENT DOCUMENTS 3,883,281  5/1975  Holley ................................. 425/222
4,091,060  5/1978  Carter et al. ....................... 264/40.1

Primary Examiner—James R. Hall
Attorney, Agent, or Firm—Ronald C. Hudgens; Patrick P. Pacella; Paul T. Kashimba

[57] ABSTRACT

An improved pelletizing apparatus comprising a pellet forming means having a slanted rotatable member, means for supplying particulate batch material to the pellet forming means, means for supplying liquid to the pellet forming means, means for rotating the rotatable member in a given direction, the pellet forming means being so arranged and constructed that the liquid and particulate batch material supplied to the pellet forming means combine to form pelletized batch material, wherein the improvement comprises paddle means for sensing the depth of material on the slanted rotatable member and transducer means connected to the paddle means and responsive to the depth sensed thereby for providing an output signal that is indicative of the depth sensed by the paddle means.

9 Claims, 4 Drawing Figures

SENSING APPARATUS FOR PELLETIZING PROCESS

CROSS REFERENCES

This application is a continuation-in-part of copending application U.S. Ser. No. 974,417 which was filed Dec. 29, 1978, and has now been abandoned.

BACKGROUND OF THE INVENTION

This invention relates to the formation of pellets for use in a melting furnace and, more particularly, to the formation of pellets for use in a glass melting furnace.

Seng, U.S. Pat. No. 4,212,613, discloses the formation of batch material into pellets by adding the batch material and liquid, such as water, to a rotary pelletizer. Rotation of the pelletizer mixes the batch material with the liquid such that the batch material added to the pelletizer evolves from a batch appearance to non-adhering discernible nuclei or seeds which gradually grow as they are moved around the pelletizer by the pelletizer's motion. The finished pellets may be placed directly into a melter or supplied to a heat exchanger through which hot gases from either the melter or an external source are passed. Preferably, the pellets are dried and preheated in accordance with the teachings of Hohman, Seng, Henry and Propster in U.S. Pat. Nos. 4,248,615 and 4,248,616. The preheating of the pellets provides an energy savings since less energy is required to melt the batch. In addition, the hot exhaust gases from the furnace contain useful batch particulates that are imparted to the batch, thereby allowing recovery of this material which would otherwise be expelled into the atmosphere.

The components of the batch material supplied to the pelletizer tend to segregate during transportation thereto. This segregation is not harmful to the operation of a glass furnace, since the components of the pellets average out over a period of time. However, the short variations in the batch components affect the pellet forming ability of the batch material, and hence the size of the finished pellets. Certain glass batches have particle sizes that vary widely, thus resulting in greater segregation and variation of the batch than for other batches. In addition, the feed rate of the batch to the pelletizer may vary. Therefore, it is necessary to accurately predict the size of the pellets being formed within the pelletizer so that the water being supplied to the pelletizer can be controlled to respond to variations in the composition of the batch and/or the rate of feed of the batch, thereby producing pellets within the desired tolerance. As is known in the art, increasing the amount of water supplied to the pelletizer increases the size of the finished pellets; whereas, decreasing the amount of water reduces the size of the finished pellets.

The pellets should be uniform within a prescribed tolerance. Generally, pellets having a nominal diameter of one-half inch, with a range of three-eighths to five-eighths inch, have been found to be the optimum size for obtaining maximum heat transfer from the hot combustion gases to the pellets. If the pellets are too small, they excessively restrict the flow of gases through the preheater; whereas, if the pellets are too large, the surface to weight ratio is reduced which results in less heat being transferred to the pellets. Furthermore, the large pellets may have moisture trapped therein which may cause them to explode when the moisture turns to steam.

A rotary pelletizer can be divided into contiguous sections with each formative stage of the pellets pertaining to a respective section of the pelletizer. Generally, the lighter pellets, which are in the earliest formative stages, will be propelled in the widest rotational path and will follow an elliptical path with the widest circular orbit. As the pellets become heavier, the motion or path of the pellets will become more elliptical, since the heavier pellets will experience a deceleration sooner than the lighter pellets. Accordingly, it is possible to identify the formative stages, as well as the relative sizes of the pellets on a cross section of the pelletizer, by identifying the appropriate sector in that cross section.

Seng, U.S. Pat. No. 4,212,613, discloses the use of a pelletizer having a rotating disc, a sensor for detecting a variation in the batch level and means operatively connected to the sensor for varying the amount of water supplied to the pelletizer in response to the sensed variation in batch level. The sensor is positioned generally at an upward portion of the disc where it is contacted during the pelletization process by an upwardly moving stream of batch material prior to the formation of non-adhering discernible pellet seeds. The sensor consists of a paddle that is pivotally connected so that the paddle is free to move when contacted by the material on the disc of the pelletizer. The arm of the paddle is normally held against a switch by a spring to keep the switch in the open position. When the depth of the material reaches a predetermined level, the paddle is contacted and moved away from the switch, thereby allowing it to close and, in turn, close a valve to reduce the amount of liquid provided to the pelletizer.

Accordingly, it is apparent that the sensor of Seng provides only a single output which indicates whether or not the material on the disc is above or below a predetermined level. However, in many control systems it is desirable to provide a signal that is directly proportional to the level or depth of the material on the disc to proportionately control the rate of supply of liquid or batch material to the pelletizer.

Therefore, it is an object of this invention to provide an apparatus for determining the level or depth of material on the disc of the pelletizer and for providing a signal indicative thereof.

SUMMARY OF THE INVENTION

In accordance with the present invention, there is provided an improved pelletizing apparatus comprising a pellet forming means having a slanted rotatable member, means for supplying particulate batch material to the pellet forming means, means for supplying liquid to the pellet forming means, means for rotating the rotatable member in a given direction, the pellet forming means being so arranged and constructed that the liquid and particulate batch material supplied to the pellet forming means combine to form pelletized batch material, wherein the improvement comprises paddle means for sensing the depth of material on the slanted rotatable member and transducer means connected to the paddle means and responsive to the depth sensed thereby for providing an output signal that is indicative of the depth sensed by the paddle means.

In one embodiment, the present invention comprises a pivoted paddle that is deflected by the material on the disc of the pelletizer and a transducer that is operatively connected to the paddle for providing a signal that is indicative of the position of the paddle. The paddle is cammed against the transducer in one direction so that deflection of the paddle causes motion of the transducer. When the force of the material against the paddle has been removed, a suitable force producing means moves the paddle in the opposite direction. The transducer has a limited range of movement so that an erroneous indication is not produced at restart by the pellet load moving past the paddle in an upward, rather than a downward direction. Such movement causes the paddle to deflect, but the transducer only follows the paddle until it reaches its limit position. Accordingly, the sensor assembly provides a high degree of sensitivity and accuracy for controlling the pelletization of any glass batch.

Other objectives, advantages and applications of the present invention will be made apparent by the following detailed description of the preferred embodiments of the invention.

DETAILED DESCRIPTION OF PREFERRED EMBODIMENTS

Figure 1:
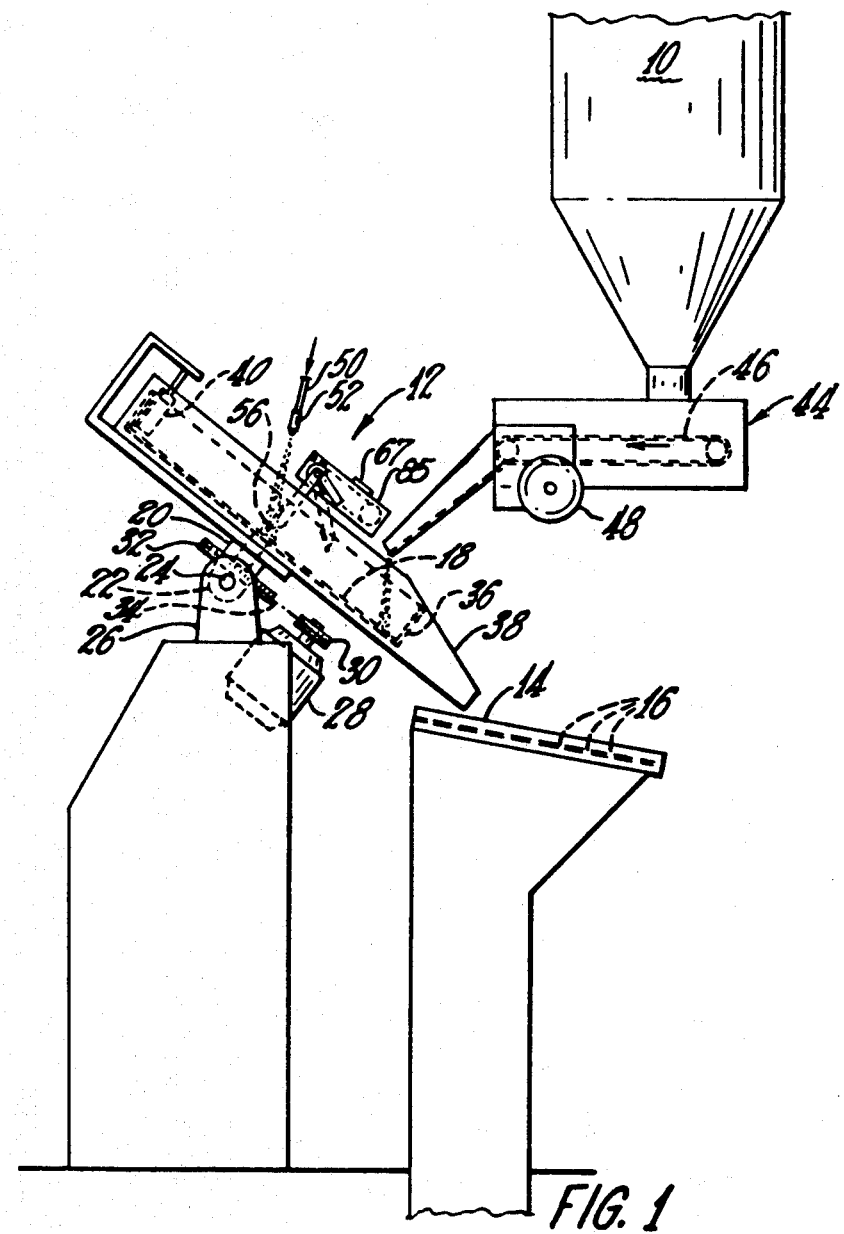
FIG. 1 is a schematic view in elevation of the incorporation of the sensing apparatus of the present invention into an apparatus for forming batch material into pellets.
Figure 2:
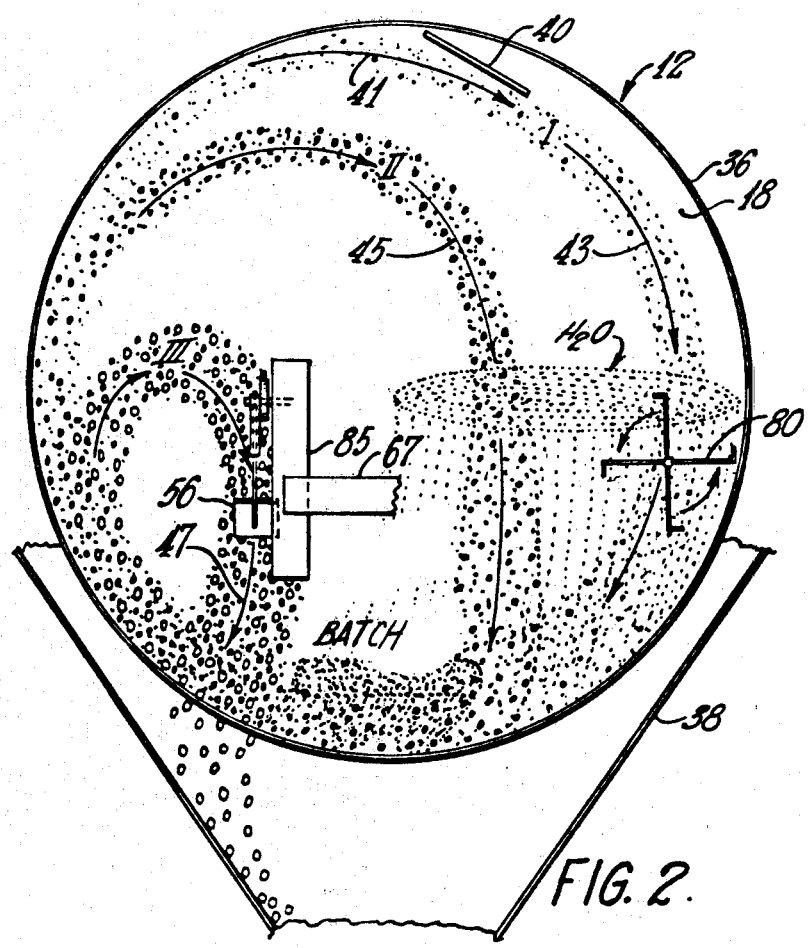
FIG. 2 is an enlarged, diagrammatic view of a disc of the pelletizing apparatus of FIG. 1.

Referring to FIGS. 1 and 2, a particulate, which may be a heat-softenable glass batch material, is provided by a supply hopper 10 to a pelletizer 12 by means of a suitable feeder 44, which is shown as having a conveyor belt 46 that is driven by a motor 48. Other types of batch feeders, such as vibratory feeders, can also be utilized with the present invention; therefore, the batch feeder described should be interpreted as exemplary and not in a limiting sense.

Pelletizer 12 includes a movable surface in the form of a rotatable member or disc 18. In the description of pelletizer 12, the uppermost portion of disc 18 is considered to be the 12 o'clock position. Disc 18 is rotatably carried on a bearing housing 20 which is pivotally mounted on ears 22. Ears 22 are carried on an axle 24 which is mounted on a stand 26. Disc 18 is rotated by a motor 28 through drive and driven sprockets 30 and 32 and chain 34. Disc 18 is surrounded by an annular partition or wall 36.

Batch from supply hopper 10 may be fed to a lower central portion of disc 18, i.e., along a chord of disc 18 between about the 5:30 and 6:30 o'clock positions, by feeder 44. Water is supplied to a middle right-hand portion of disc 18 by a supply line 50 and a nozzle 52. The water may be supplied in a flat spray at roughly a 3 o'clock position and may have a length extending from one third to one half of the diameter of disc 18. Preferably, the water may be furnished by sprays located generally on a chord between the 4 and 8 o'clock positions but to the right of a diameter running through the 6 and 12 o'clock positions of disc 18.

With disc 18 slanted at a predetermined angle to the horizontal, such as forty degrees, as determined by the position of ear 22 on axle 24, and rotating in a clockwise direction, the batch moves in generally elliptical patterns as it is carried in a clockwise direction up the periphery of disc 18 and then down disc 18 at least partially under the influence of gravity. More specifically, the particulate batch moves in an arcuate upward path around the periphery of disc 18, adjacent wall 36, and the downward travel of the batch and partially-formed pellets may be viewed as being along three rather distinct paths.

As the seeds develop in size, becoming larger and approaching the size of the finished pellets, the force imparted by the rotational motion of the pelletizer is not sufficient to maintain a circular path around the periphery of the pelletizer; therefore, the pellets fall of their own weight forming an elliptical path. As the pellets become larger in size, their path becomes shorter and more elliptical since they fall sooner under the influence of gravity. Accordingly, the largest pellets, i.e., the pellets approaching the size of the completely formed pellets, form the smallest elliptical path.

For the sake of explanation, disc 18 may be divided into three sections to show the paths of downwardly moving batch and partly-formed pellets. It should be noted, however, that the sections, as shown in FIG. 2, are not discrete and separate, but rather contiguous and gradually or generally continuously changing across the cross section of the pelletizer. In path 43 of Section I adjacent the periphery of disc 18 are the non-adhering seeds or nuclei. Section II, which is located inward of Section I in the direction of the center of the elliptical paths formed by the movement of the pellets, has a path 45 containing partially formed pellets. Section III, in which the sensor of the present invention is positioned, as discussed in detail below, has a path 47 which denotes the tightest elliptical path of the pellets, such pellets being almost finished. The essentially finished pellets move in a continuous tight elliptical path until they tumble over wall 36 onto trough 14 which has openings 16 through which the smaller or broken pellets fall. The finished pellets may then be supplied to a suitable vertical conveyor and carried to the top of a heat exchanger for preheating prior to being placed in a melter. Preferably, the pellets are dried and preheated in accordance with the teachings of Hohman, Seng, Henry and Propster in U.S. Pat. Nos. 4,248,615 and 4,248,616.

A scraper 80, which rotates in a direction opposite to the rotational direction of disc 18, i.e., in a counterclockwise direction, is positioned in approximately the 4 o'clock position of pelletizer 12. Scraper 80 removes any accumulated material which may tend to build up on the periphery of disc 18 and reintroduces it into the circulation of batch. Scraper 80 may be used in place of stationary scrapers or may be used in conjunction therewith. Preferably, the rotary scraper includes two pairs of generally normally related arms with each arm having a radius of about one half of the radius of the pelletizer disc and has its axis of rotation about midway along the radius of disc 18 drawn to about the 3 o'clock position. One pair of arms, which may be viewed as a diameter of the circle through which the device rotates, includes scrapers at its diametric end portions adapted to scrape the side wall of the pelletizer. The other pair of arms includes diametrically opposed scrapers operating closely adjacent to the bottom of disc 18.

Disc 18 is also provided with a stationary plow 40 extending inwardly from about the 12 o'clock position, but more preferably, extending inwardly from about the 11:30 o'clock position and intersecting a diameter through the 6 and 12 o'clock positions at an angle of about 45°. Plow 40 directs the batch material and any formed non-adhering seeds into the circulating stream within the pelletizer. Other stationary plows may be used, if necessary, to prevent the mixed material from accumulating and clogging the pelletizer.

The present invention concerns an apparatus for sensing the depth of the material on disc 18; the sensing apparatus may be placed in any suitable location. For example, in my copending application, Ser. No. 095,268, filed Nov. 29, 1979, which is a continuation-in-part of copending application Ser. No. 974,470, filed Dec. 28, 1978, now abandoned Dec. 28, 1978, the depth of the substantially finished pellets at a downward portion of an elliptical path is sensed, this depth being indicative of the size of the finished pellets.

Figure 3:
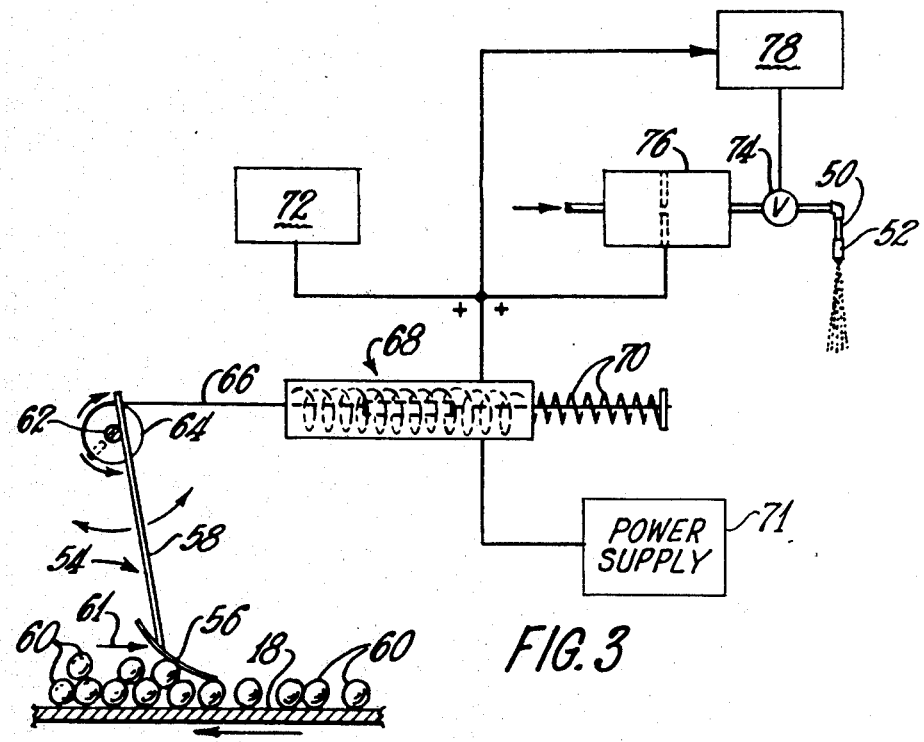
FIG. 3 is a diagrammatic view of controls for proportioning the amount of liquid to batch material in response to the output of the sensing apparatus of the present invention.

A device for gradually and continuously changing the ratio of liquid or water to particulate batch material in response to incremental movements of the sensing apparatus of the present invention is shown in FIG. 3. A paddle 54, is positioned in pellet stream 47 in accordance with the principles set forth in my aforementioned copending patent application, Ser. No. 095,268. Paddle 54 is deflected in the direction of arrow 61, which represents a downward direction, by movement of pellets 60 in the direction of arrow 61 against blade 56 of paddle 54. Blade 56 is attached to a shaft 58 that is rotatably connected to a shaft 62 which, in turn, is connected to a pulley 64. One end of wire 66 is attached to pulley 64, and the other end is attached to the movable member of linear motion transducer 68. The input power is supplied to transducer 68 by power supply 71.

Transducer 68 may be a transformer-type device in which a movable magnetic core is displaced axially by paddle 54 with the output signal having two basic analog components: phase relationship with the excitation voltage, indicating the direction of travel and voltage amplitude, indicating the length of travel. The output of transducer 68 is responsive to the movement of wire 66, which is a function of the deflection of paddle 54. Spring 70 is attached to the opposite end of the movable member of transducer 68 so that it opposes the force exerted through wire 66. Movement of paddle 54 in the direction of arrow 61 under the influence of moving pellets 60 deflects shaft 58 thus rotating pulley 64 counterclockwise and pulling wire 66 out of transducer 68 against the force of spring 70. As the level of pellets 60 diminishes, spring 70 causes paddle 54 to rotate in the clockwise direction.

A signal generator 72 provides a reference signal which may be a pure reference or may be indicative of a desired water flow. A sensing means 76, which may be a differential pressure cell, measures the flow of water through valve 74 to line 50 and nozzle 52 and produces a signal indicative of the measured water flow. The signals from transducer 68 and sensing means 76 are respectively indicative of the actual paddle position and the actual water flow. These measured signals are then compared with the reference signal from generator 72 to produce an error signal. The error signal is used to drive valve controller 78 which is connected to valve 74, in a direction to reduce the error signal; valve controller 78 may be, for example, a pneumatic cell. In this control scheme, the reference signal is used as a set signal and may be compared with either the paddle position signal, the water flow signal or with combined paddle position and water flow signals. For control purposes, any suitable control algorithm may be used, such as proportional, integral, derivative or any combination thereof. A more complete description of a control system which may be used with the sensing apparatus disclosed herein is shown in copending U.S. applications Ser. No. 974,419, Varrasso, and Ser. No. 974,456, Varrasso and Henry, both of which were filed concurrently with the parent of the subject application, the first of which has been abandoned in favor of continuation application Ser. No. 232,068, filed Feb. 6, 1981, and the second of which has issued as U.S. Pat. No. 4,251,475; all of such applications are assigned to a common assignee.

Figure 4:
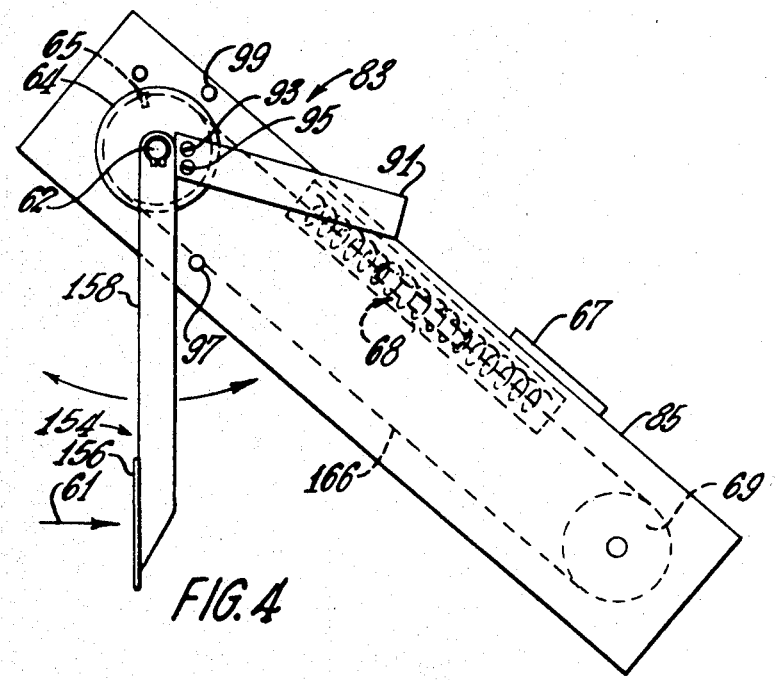
FIG. 4 is a detailed view of the paddle and transducer assembly of the present invention.

Referring now to FIG. 4, sensor assembly 83 has a mounting means 85 which may be a block or other suitable support for mounting the individual parts of the assembly. Mounting means 85 is attached to support 67 (partially shown) such that mounting means 85 is parallel to the surface of disc 18 (refer to FIG. 1). Shaft 158 is mounted for free pivotal movement on shaft 62 which is attached to mounting means 85. Also mounted on shaft 62 is a drive means for wire 166, such as pulley 64. Fixably mounted to pulley 64 is a means for providing a rotational force in the clockwise direction to pulley 64 which may be a counterweight 91 attached to pulley 64 by suitable fasteners. The ends of wire 166 are attached to opposite ends of the movable member of linear motion transducer 68, and wire 166 is wound around pulley 64 and second pulley 69 to form a continuous loop so that transducer 68 may be operated in both directions. A fastener 65 attaches wire 66 to pulley 64, and pulley 69 is attached to mounting means 85.

The movement of counterweight 91 is limited by stop 97 in the clockwise direction and stop 99 in the counterclockwise direction, which are attached to mounting means 85. Such constraint also limits the movement of pulley 64, thus limiting the movement of transducer 68 to maintain the output thereof within the correct range. Pellets 60 moving in the direction of arrow 61, which represents a downward direction, contact blade 156 causing paddle 154 to deflect in the counterclockwise direction. Shaft 158 of paddle 154 engages counterweight 191 and causes it to rotate from stop 97 in a counterclockwise direction towards stop 99. As counterweight 91 rotates, it rotates pulley 64, thus winding wire 166 and altering the position of transducer 68, which provides an indication of the position of paddle 154. If the depth of the pellets decreases, paddle 154 and pulley 64 are moved in the clockwise direction by counterweight 91. Accordingly, wire 166 is wound in the opposite direction and transducer 68 is displaced in the opposite direction.

When counterweight 91 has reached its extreme position in the clockwise direction against stop 97, continued movement of paddle 154 in the clockwise direction does not change the output of transducer 68. This feature is significant during start-up of pelletizer 12. At such time the bulk of the pellets will be either below paddle 154 or to the right thereof, as viewed in FIGS. 1 and 2. Starting the pelletizer will cause the pellets to move past paddle 154 in an upward rather than a downward direction, thus deflecting paddle 154 in the clockwise direction. However, the output of transducer 68 will not be affected since the movement of counterweight 91 will be limited by stop 97. Consequently, paddle 154 does not provide an erroneous reading during the start-up phase. If desired, a stop may be provided for paddle 154 to limit its movement in the clockwise direction, for example, at the 11:30 o'clock position, as viewed in FIG. 4.

Additionally, paddle 154 may be swung free of the pellets and the pelletizer any time during the process, including start-up, when it is desired to manually adjust the liquid or particulate input into the pelletizer. By rotating shaft 158 to approximately the 3:00 o'clock position, as viewed in FIG. 4, either the liquid or particulate may be adjusted to proper proportion. In this manner a proper mechanical zero for paddle 154 may be established. After calibration, paddle 154 is rotated back by counterweight 91 to be deflected by pellets 60 moving in the direction of arrow 61.

The device shown in FIG. 4 requires a means to move pulley 64 in the opposite direction to its movement under the force of pellets 60 against blade 156. Counterweight 91, which provides a force under the influence of gravity, has been disclosed; however, any other suitable device may be used, such as an electrical, pneumatic or mechanical device.

A time delay may be used, as necessary, to provide sufficient time for the pellet load to build up before placing paddle 154 in operation; this would be especially useful during restart where several or more layers of pellets are present during the steady state, but some of the load was spilled during the stoppage of the operation. In restart, the load would be less than the steady state load; therefore, the level of the pellets would be below the paddle position causing the paddle to provide an erroneous reading. The delay timer would disconnect the output signal of the paddle assembly from the control unit for a predetermined time to allow the load within the pelletizer to build up to its steady state level. This delay time must be determined empirically for each operation, since it depends upon the size of the pelletizer, ingredients of the batch, incline of the pelletizer, and the amount of load that is spilled when the pelletizer is stopped. The delay timer can also be used in the initial start-up of the pelletizer to disconnect the sensor output from the control unit until steady state conditions have been reached.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

I claim:

1. In an apparatus for pelletizing particulate batch material, the apparatus being a pellet forming means having a slanted rotatable member, means for supplying particulate batch material to the pellet forming means, means for supplying liquid to the pellet forming means, means for rotating the rotatable member in a given direction, the pellet forming means being so arranged and constructed that the liquid and particulate batch material combine to form pellets, the improvements comprising:
    (a) pivotably mounted paddle means deflectable in one direction upward and away from the rotatable member by contact with substantially finished pellets and deflectable in an opposite direction towards the rotatable member by a spring or counterbalance biasing means;
    (b) a transducer means connected to the paddle means and responsive to the deflection of the paddle to provide an output signal that is indicative of and proportional to the size of the pellets deflecting the paddle means;
    (c) a signal generating means to provide a reference signal which is compared to a second signal from a liquid flow measuring means and is then added to the signal from the transducer means to provide a sum signal; and
    (d) a valve means which is responsive to the sum signal and operable to increase or decrease the liquid flow to adjust the size of the pellets produced.

2. An apparatus as recited in claim 1, wherein the transducer means is engaged with the paddle means only when the size of the substantially finished pellets deflecting the paddle means is within a predetermined range.

3. An apparatus as recited in claim 1, wherein the transducer means is displaced by the paddle means and the movement of the transducer means is constrained within a predetermined range.

4. An apparatus as recited in claim 3, wherein the paddle means is mounted for free pivotable movement outside the range of movement of the transducer means.

5. An apparatus as recited in claim 4, wherein the paddle means comprises a shaft having one end rotatably mounted and a blade attached to the other end thereof.

6. An apparatus as recited in claim 5, wherein the transducer means comprises a housing, a pair of pulleys rotatably attached to the housing, and a linear motion transducer having a pair of opposite ends respectively attached to opposite ends of a wire that is disposed around the pulleys.

7. An apparatus as recited in claim 6, wherein the force providing means comprises a weight attached to one of the pulleys.

8. An apparatus as recited in claim 5, wherein the transducer means comprises a housing, a pulley rotatably attached to the housing, a linear motion transducer, a wire having one end attached to the pulley and the other end attached to a first end of the linear motion transducer, and the force providing means comprises a spring having one end attached to a second end of the linear motion transducer and the other end attached to the housing.

9. An apparatus as recited in claim 1, wherein the transducer provides an output signal that has two components, the first component indicating whether the size of the substantially finished pellets is above or below a predetermined size and the second component indicating the amount that the sensed size of the substantially finished pellet is above or below the predetermined size.

* * * * *